Nov. 14, 1967  W. A. MINIX  3,352,145
AIR GAUGE

Filed Aug. 4, 1965  5 Sheets-Sheet 5

INVENTOR
WILLIAM A. MINIX

BY *Cullen, Sloman & Cantor*

ATTORNEYS

Nov. 14, 1967 W. A. MINIX 3,352,145
AIR GAUGE
Filed Aug. 4, 1965 5 Sheets-Sheet 4
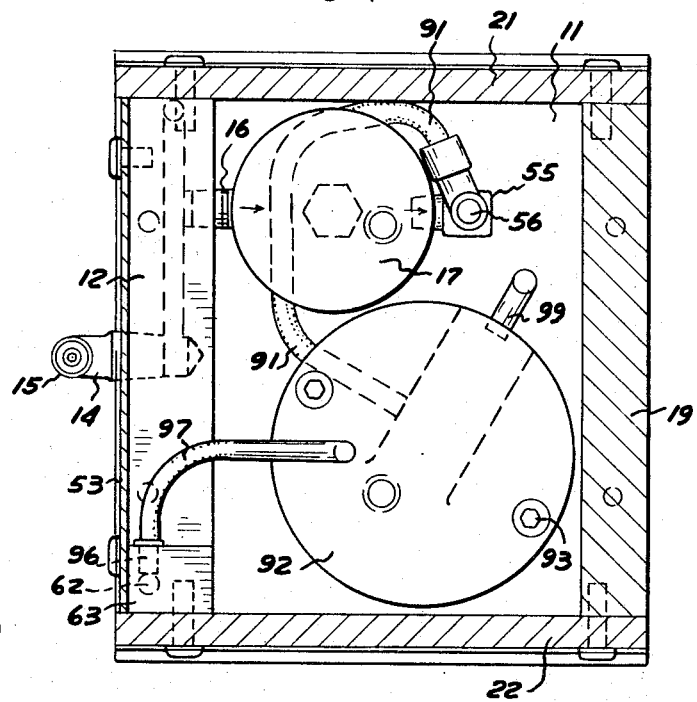
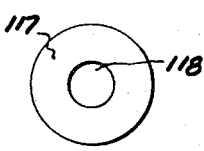
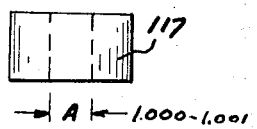
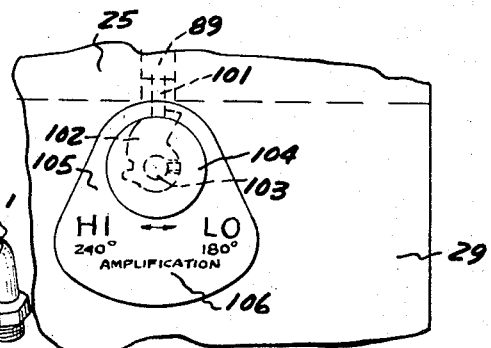
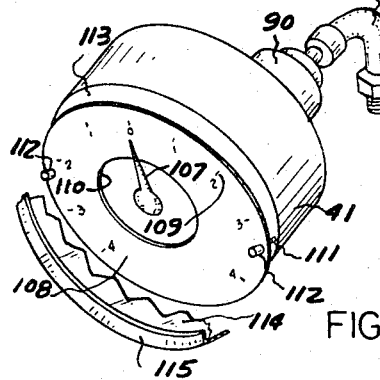
INVENTOR
WILLIAM A. MINIX
BY
ATTORNEYS

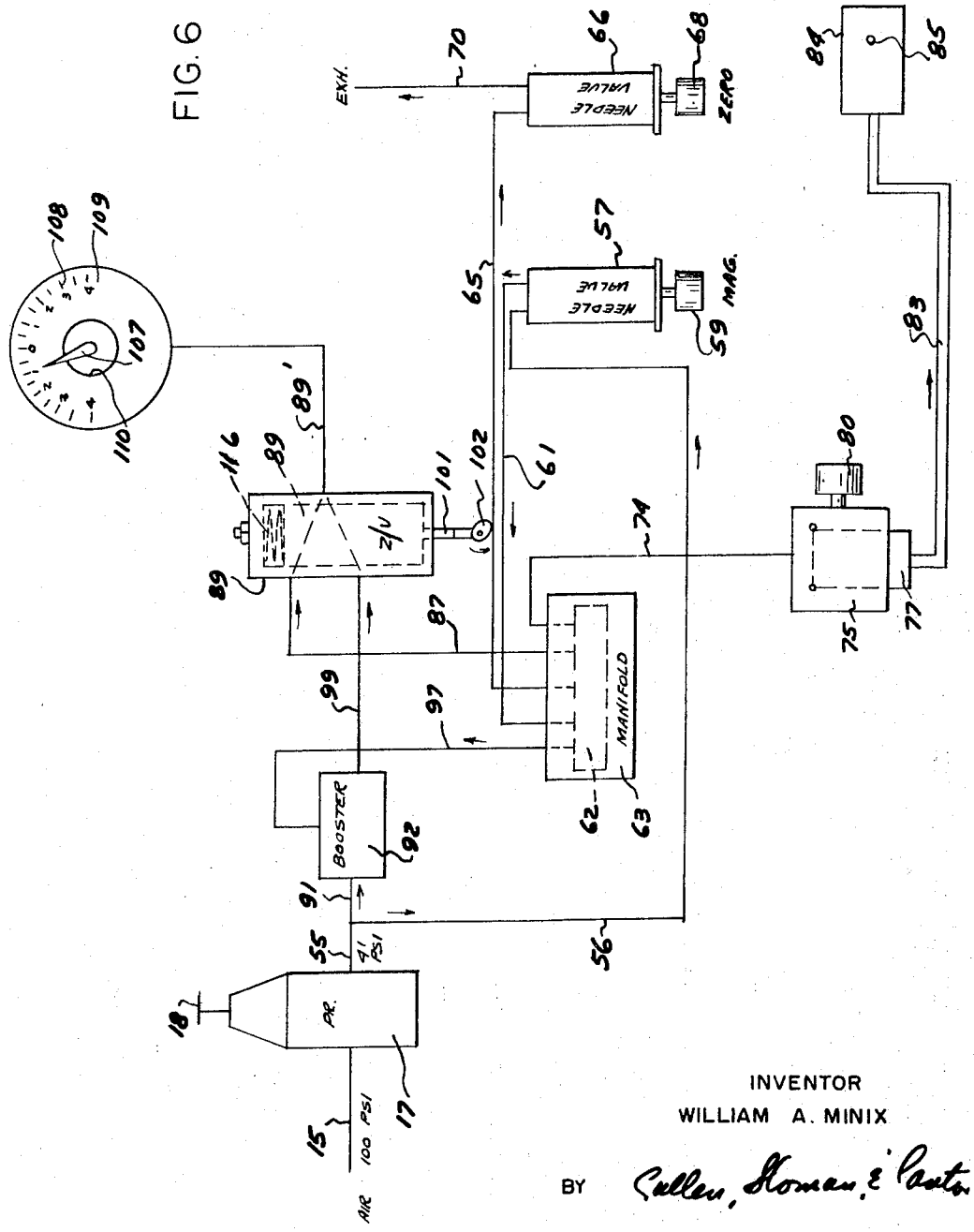

United States Patent Office 3,352,145
Patented Nov. 14, 1967

3,352,145
AIR GAUGE
William A. Minix, Detroit, Mich., assignor to Freeland
Gauge Company, Detroit, Mich.
Filed Aug. 4, 1965, Ser. No. 477,270
10 Claims. (Cl. 73—37.9)

ABSTRACT OF THE DISCLOSURE

An air flow device for gauging bores including a manifold chamber, a dial gauge connected thereto, an adjustable flow control valve interconnecting a source of regulated air pressure with said chamber; an adjustable air bleed valve connected to said chamber, an air bleed gauge element with an orifice adapted for application to a bore to be gauged, connected to said manifold chamber; an air pressure responsive booster valve selectively connected to said dial gauge and source of regulated air pressure and connected to and responsive to control pressure in said manifold chamber for supplying an increased pressure to said dial gauge proportional to varying pressure conditions in said manifold chamber, together with adjustable valve means for selectively activating said booster valve.

---

The present invention relates to an air flow device for gauging bores or the predetermined dimension of a part, wherein air leakage from a gauge element within said bore or relative to such part is visibly measured and compared with air leakage from said gauge element within a predetermined master bore or part of predetermined dimension, thus, providing a range for the selection or rejection of workpieces.

The present invention is an improvement over my earlier Patent 3,170,318 dated Feb. 23, 1965, entitled, "Air Gauge."

It is an object of the present invention to provide an air flow device mounted upon a base and within a housing a manifold chamber to which a source under regulated pressure is connected, and incorporating valve means for regulating the amount of air flowing from the pressure source to said chamber and for bleeding off air from said chamber and further incorporating a gauge element having an orifice connected with said chamber for projection into the bore or relative to a part to be gauged and wherein the escape of air from the gauge element modifies and varies pressure conditions within the manifold chamber and wherein an air pressure responsive gauge was connected to the manifold chamber for indicating the changing pressure conditions therein proportional to and corresponding to the amount of air bleeding of the gauge element with respect to a particular bore or dimension being gauged. Such readings are compared with the amount of air escape when the gauge element is projected within a master bore or predetermined dimension and a comparison made to provide a range for the selection or rejection of workpieces.

In the operation of devices of this type oftentimes for certain types of gauging operations it is necessary to switch to an increased pressure source or a boosted air pressure where approximately the regulated source of air pressure is increased, for example three times the original air pressure for certain types of gauging operations.

Heretofore it was necessary to switch from one gauge operating at lower pressure to another gauge operating at a boosted air pressure.

The present invention has for another object the incorporation into the present air flow device an air pressure booster assembly also under the control of the air bleed modified manifold chamber providing for the communication to the gauge, which is air pressure responsive, and by which the air pressure supply may be either the low pressure in one circuit or a boosted air pressure in an auxiliary circuit together with a manual means for switching from one circuit to the other, utilizing the same gauge element and utilizing the single air pressure responsive gauge with needle and calibrated dial.

It is another object of the present invention to incorporate in conjunction with said assembly a two way valve having a pair of inlets and a single outlet connected to the air pressure responsive gauge with one inlet from the valve connected with the low pressure manifold chamber and with the second inlet connected with the booster outlet, but under the control of the said low pressure manifold chamber together with a manual means switching from one circuit to the other in the same instrument.

It is another object to provide in the present air flow device a housing including a front wall having a fixed lower panel and an apertured upper panel which mounts the air pressure responsive gauge and which is pivotally connected to the lower panel and incorporating means for angularly adjusting the said upper panel for regulating the angular inclination of the air pressure responsive gauge face for the convenience of the particular operator.

It is another object to provide in conjunction with the air flow device and in conjunction with the front wall of the housing of an apertured spindle adapter together with means for removably receiving adapter sleeves adapted to receive interchangeably various gauge elements or for the connection of a conduit to a gauge element.

It is another object to incorporate within the air flow device a novel means for incorporating valve means for switching the pneumatic circuits from a low pressure to a boosted air pressure circuit together with means for handling exhaust air and for muffling the same.

It is another object to provide in conjunction with the normal oil operated gauge an air pressure responsive adapter connected thereto for transmitting uniform pressure to the said gauge for improved readings and to eliminate flutter.

It is another object to incorporate into the present construction an improved gauge body and novel dial assembly providing for easy interchangeability of dials and a means for anchoring the dial effectively and simply within and adjacent to gauge face.

These and other objects will be seen from the following specification and claims in conjunction with the appended drawings in which:

FIG. 4 is a fragmentary plan section of the upper portion of the said gauge taken in the direction of arrows 4—4 of FIG. 3.

FIG. 5 is a fragmentary plan view thereof.

FIG. 6 is a schematic, diagrammatic view of the present gauge.

FIG. 7 is a fragmentary, partly exploded view of the air pressure responsive gauge assembly.

FIG. 8 is an elevational view of a master ring.

FIG. 9 is a plan view thereof.

Figure 1:
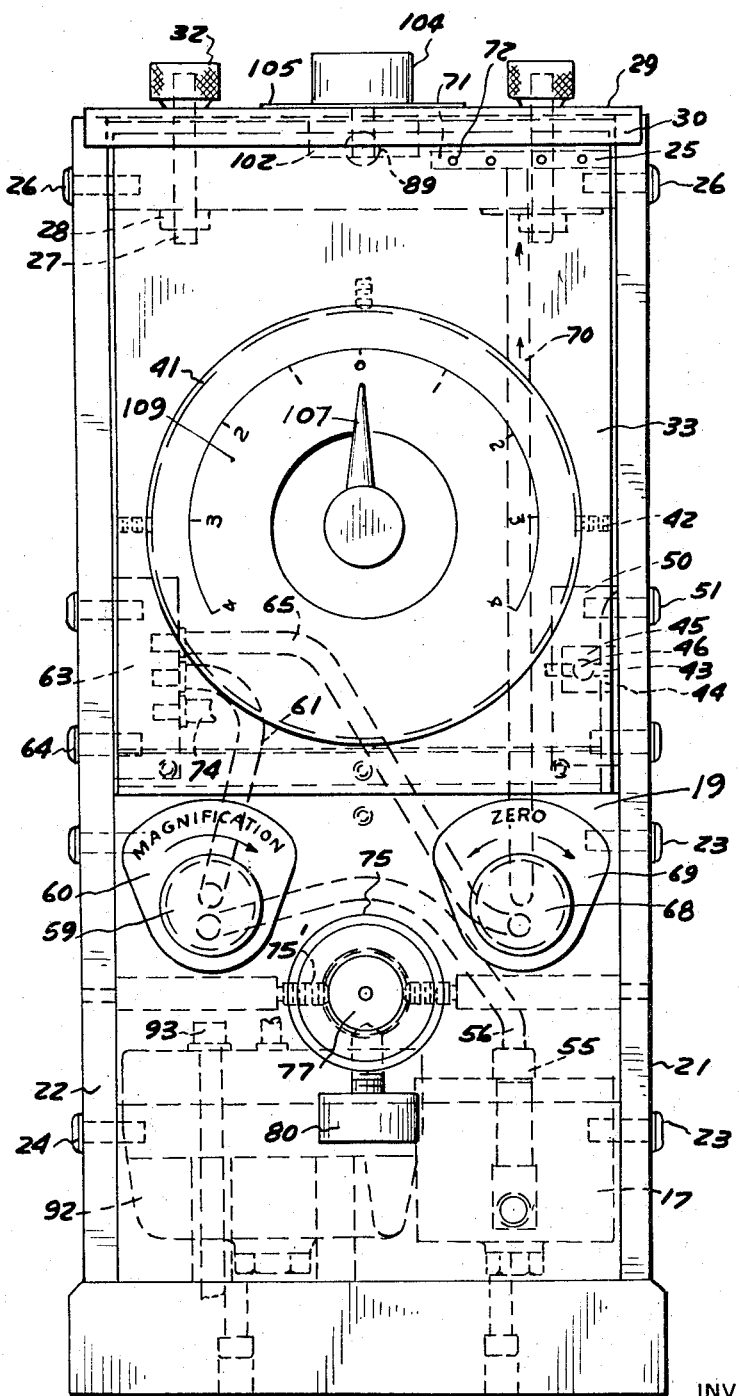
FIG. 1 is a front elevational view of the present air flow device or air gauge.

It will be understood that the above drawings illustrate merely a preferred embodiment of the invention, and that other embodiments are contemplated within the scope of the claims hereafter set forth.

Referring to the drawings, upon the base 11 across the rear thereof is mounted the block 12 secured thereto by fasteners 13. Fitting 14 is connected to block 12 and to the air intake pipe 15 connected to a source of air under pressure. This air is delivered through fitting 16 to pressure regulator 17 within the housing shown in FIG. 1 including conventional adjusting means 18 to thus provide for the operation of the present gauge of a source of air under regulated pressure.

Gauge housing

The gauge housing includes front wall bottom panel 19 secured to said base by fasteners 20 and the upright opposed spaced sidewalls 21 and 22 secured by fasteners 23 and 24 to front wall panel 19. Said sidewalls also are secured to the block 12 by additional fasteners 24 and 23, FIG. 3.

Block 25 is interposed between upper rear portions of the said sidewalls and fixedly secured thereto as at 26, FIG. 1. A pair of upstanding bolts 27 are threaded through block 25, FIGS. 1 and 2, and their lower projecting ends are anchored by nuts 28. Upper portions of the securing bolts 27 extend through the cover plate 29 including depending front flange 30 and rear flange 31 and cooperatively receive the knurled fastening nuts 32 for retaining the top plate in the position shown.

Figure 3:
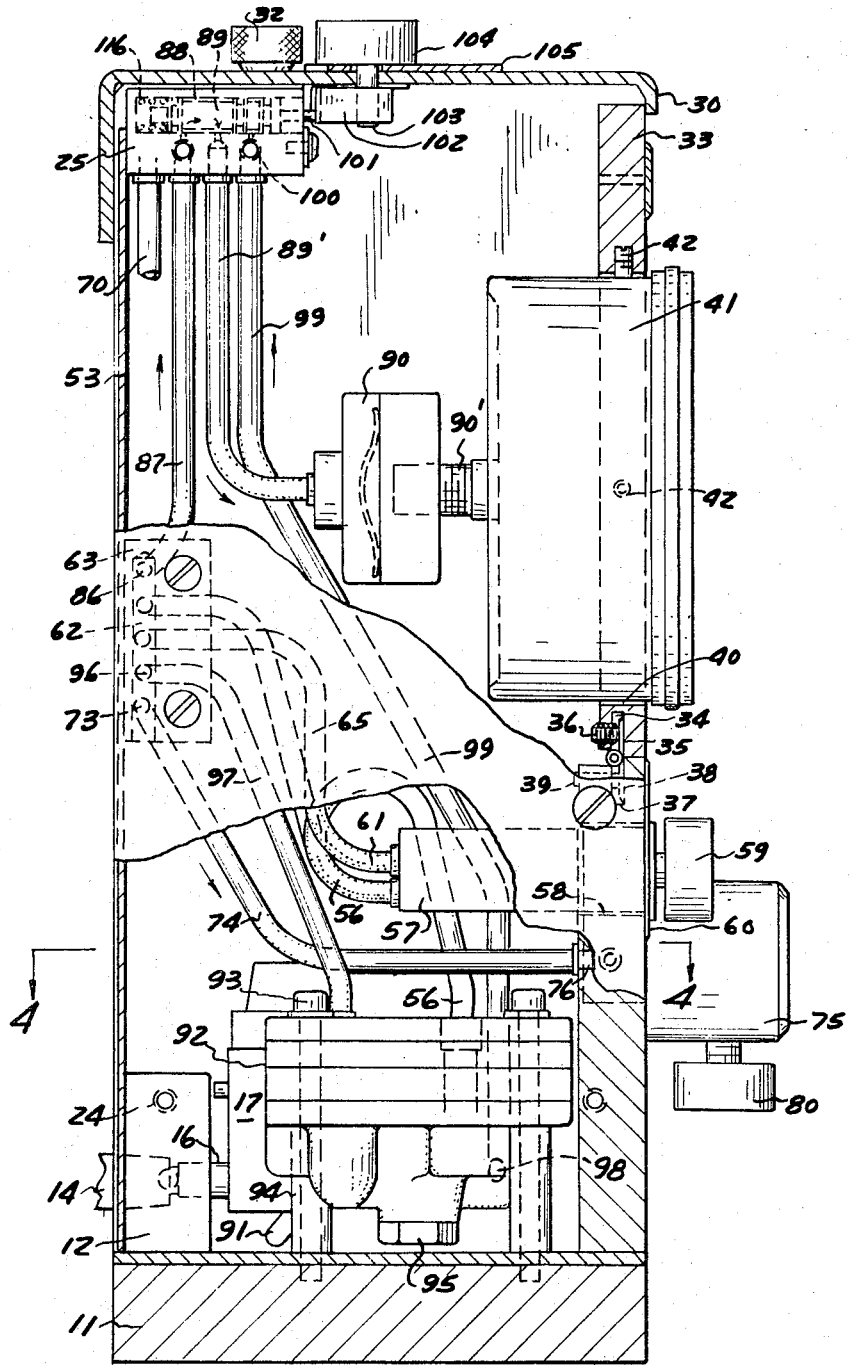
FIG. 3 is a left side elevational view thereof with a portion thereof broken away and sectioned for illustration.

The front wall includes an upper tiltable panel 33 which along its bottom edge has an undercut slot 34 to receive the hinge element 35 anchored therein by a series of set screws 36, FIG. 3. The upper edge of the stationary bottom panel 19 is slotted at 37 to receive the lower portion 38 of the hinge which is fixedly secured therein by a series of transverse set screws 39 to complete the hinge construction and mounting for the tiltable upper panel 33 which is apertured at 40 to receive the air pressure responsive gauge 41 secured therein by set screws 42.

Figure 2:
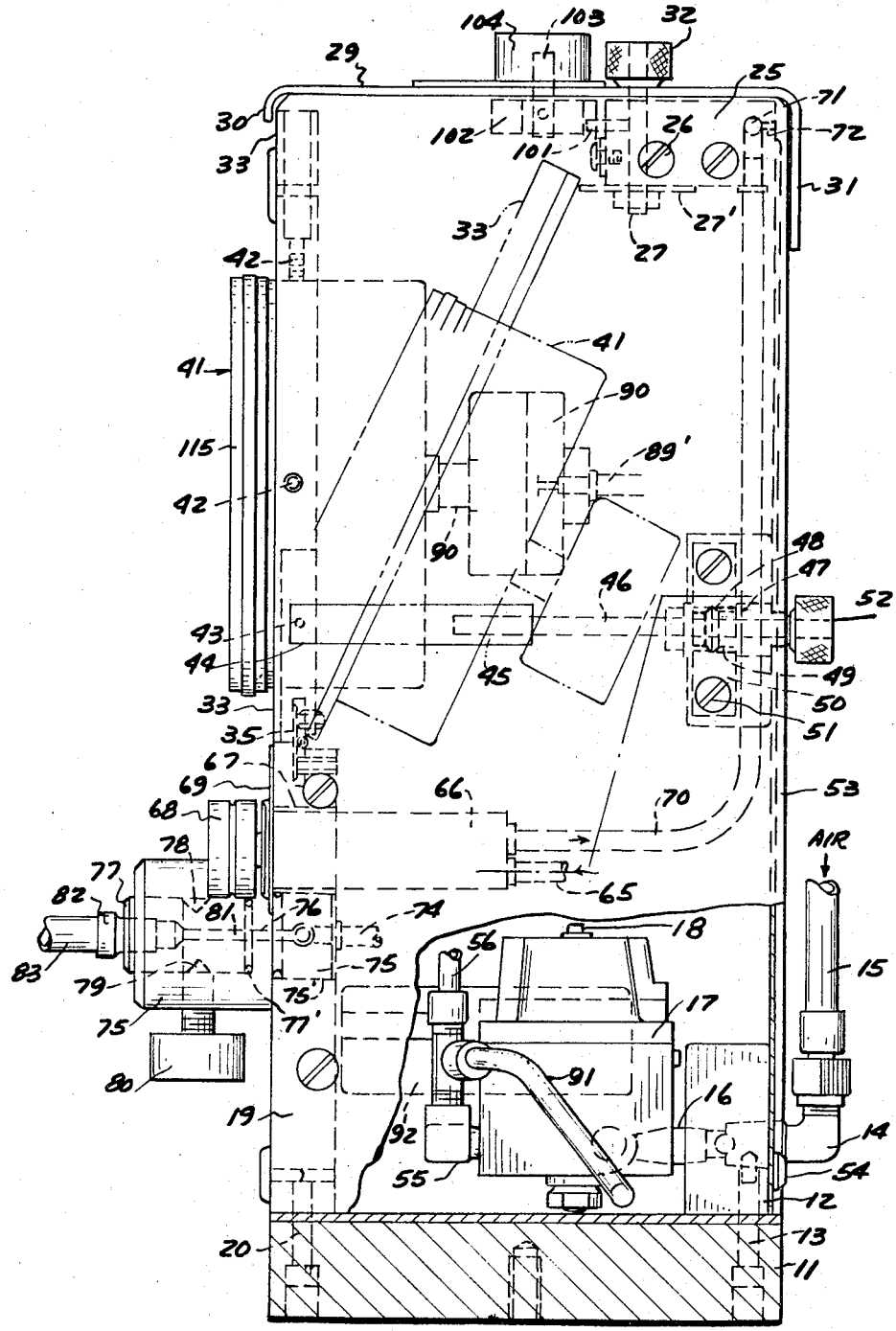
FIG. 2 is a right side elevational view thereof with a portion broken away and sectioned for illustration.

The gauge mounting panel 33 is retained in the upright position shown in FIG. 3 by the front flange 30 of the cover plate and in the extreme tilted position shown in dotted lines, FIG. 2, bears against the stop washer 27' anchored to block 25.

Dial head positioner

Laterally extending pin 43, FIG. 2, on one side of the movable panel 33 is connected to the rearwardly extending clevis 44 mounting an internally threaded block 45 which receives adjusting screw 46 carrying a knurled control handle 52 at its outer end outwardly of the rear wall 53 of the housing which is secured as at 54 to the transverse block 25, FIG. 2. The screw 46 receives the adapter sleeve 47 which has an annular fulcrum flange 48 thereon which is swively positionable within the bore 49 of the mounting block 50 fastened as at 51 to sidewall 21, FIG. 1. Thus, the dial head positioner provides a means by which the adjusting screw 46 is tiltably mounted within its supporting block to accommodate the angular positioning movements of the hinged panel 33 which mounts the dial head or pressure responsive gauge 41.

By this construction the angularity of the dial face can be adjusted to the convenience of the user at any desired angle as at 33 shown in dotted lines, FIG. 2, merely by turning the knob 52, FIG. 2, on the end of the adjusting screw 46.

Thus the gauge may be used in the upright solid line position shown or may be tilted to any desired convenient position for best viewing by the operator.

As shown in FIG. 2 the rear flange 31 of the cover 29 extends around the upper end portion of rear wall 53 completing the housing construction mounted upon the base 11 of the present air flow gauging device.

Referring to FIG. 2 outlet T fitting 55 for the pressure regulator 17 connects the two conduits 56 and 91, with conduit 56 delivering regulated air at approximately 41 pounds per square inch to the low pressure gauge measuring system of the present device and conduit 91 delivering such air under pressure to the booster for the high pressure circuit as hereafter described.

Pneumatic circuit

Referring to FIG. 6, conduit 56 is connected to the inlet of a flow control valve 57 which may be a needle valve construction which is mounted as at 58 to the front panel 19 and includes a hand control 59 which is rotatable with respect to a dial 60 which has the word "magnification" thereon, FIG. 1, for regulating the flow through conduit 61 to the chamber 62 within the manifold 63 which is secured to sidewall 22 by fasteners 64, FIG. 1.

The conduit 65 is connected to manifold chamber 62 and at one end is connected to the bleed valve 66 which may be a needle valve construction mounted as at 67, FIG. 2, to the front panel 19 and which includes a control knob 68 rotatable with respect to the dial 69 upon which is the designation "zero," for bleeding air through outlet 70 to atmosphere being a further control on pressure conditions within the manifold chamber 62, FIG. 6.

The exhaust conduit 70, FIG. 2, communicates with the elongated muffler passage 71 within block 25 which has a series of longitudinally spaced muffler outlets 72 to atmosphere for the purpose of reducing the noise of the escaping air.

Referring to FIGS. 6 and 3, conduit 74 connects the manifold chamber at one end as at 73 and at its other end joins the spindle adapter 75, which is apertured at 76, secured within the front panel 19, FIG. 2, as at 75'.

The adapter has a longitudinal bore to receive adapter sleeve 77 removably and adjustably anchored within the adapter. Said sleeve includes an annular groove 78 of V shape in cross section, which receives the conical end portion 79 of the securing screw 80 mounted on said adapter for anchoring the sleeve 77 in position. Sleeve 77 has a registering passage 81 adapted for communication with the fitting 82 which joins the conduit 83 mounting at its outer end the gauge element 84 apertured at 85 which is normally projected into the bore of a work being gauged in comparison with a master bore 118 within the gauges 117 shown in FIGS. 8 and 9.

Referring again to FIG. 3 connection 86 to the manifold chamber 62 receives the conduit 87 connected with one inlet of the two way valve 89.

Two way valve

The two way valve is defined by a bore 88 within the block 25 within which is a movable valve spool 89 normally spring biased in one direction by the spring 116, FIG. 3, normally establishing communication between conduit 87 and conduit 89' connecting the adapter relay 90 for transmitting a uniform pressure to the fitting 90' of the gauge 41.

Pressure gauge

Gauge 41 is a conventional gauge purchasable on the market and the details thereof are omitted though said gauge may be of the Bourdon tube type which is filled with oil, the pressure of which is controlled by the adapter relay 90 also available on the market. Said relay normally includes a movable air pressure responsive diaphragm for transmitting air pressure from conudit 89' to the oil within the Bourdon tube of gauge 41 to cause movement of needle 107 with respect to calibrations 108 upon dial 109, FIG. 7.

Dial face construction

The gauge 41 at its front face 113 includes a pair of locater pins 111 which are spaced apart upon opposite sides thereof and are adapted to project into the rivets 112 which are secured to and through opposite sides of the dial 109, thus locating said dial with respect to the pins 111. The rivets 112 project forwardly of the front face of the dial 109 and are in operative engagement with the glass 114 upon the marginal holder 115, which is threaded onto the casing of the gauge body 41.

Booster circuit

Conduit 91 from the T fitting 55 of FIG. 2, as shown in FIG. 6 is connected to the intake of the booster 92. These boosters are available on the market by Moore Products, Spring House, Pa.; and operate normally employing a control chamber to a diaphragm assembly or the like and for providing an increased delivery of controlled air pressure to the conduit 99 as modified and controlled by and proportional to the air pressure within the manifold chamber 62 of manifold 63. .

In the present embodiment the booster 92 provided has an amplification factor of three for the high pressure circuit, but under the control of the manifold chamber 62 which is connected to the control chamber of the booster by the conduit 97.

The booster housing 92, FIG. 3, is mounted upon the tubular spacers 94 and secured to the base 11 by the fastener bolts 93, which extend through the booster housing and through the said spacers 94, said booster having a conventional adjusting element 95.

As shown in FIG. 3 connection 96 from the manifold chamber 92 connects with the conduit 97 to the control chamber in the upper portion of the booster 92 for thus regulating the air pressure in the delivery line 99 of the booster which connects the second inlet of two way valve 89. The delivery line 99 to said two way valve connects the booster at its outlet connection 98 shown in FIG. 3.

By this construction a high pressure air is directed to the two way valve 89 through the conduit 99, and a low pressure air is directed to the two way valve through the conduit 87. Both pressures being controlled by the manifold chamber 62 of manifold 63 and with the pressure delivered through conduit 99 being a multiple of the pressure which would normally be delivered through the conduit 87 in the low pressure system, since it is noted that the manifold chamber 62 through conduit 97 controls the operation of the booster valve 92.

Accordingly, there is a low pressure and a high pressure under the control of the gauge element 84 which communicates with the manifold chamber 62 and these two sources of pressure are delivered to the two way valve 89 which would deliver one of the two sources of pressure through conduit 89' to the air gauge depending upon the adjustment of the spool 89 within the two way valve. The latter two way valve has an in'et connection 100, FIG. 3, which in the secondary position of the spool 89 to the left of the position shown in FIG. 3 establishes communication between booster controlled air pressure through conduit 99 and the delivery conduit 89' to the adapter 90 and thence to the gauge 41.

The two way valve spool 89 has a stem 101 which projects outwardly from the block 25 and is in operative engagement with the cam 102 anchored upon the shaft 103 journalled through the cover 29 and mounting a knob 104.

The knob 104 is further shown in the fragmentary view, FIG. 5, being a top plan of the housing which shows the control plate 105 with the indicia 106 "amplification" thereon and indicating "high" or "low" depending upon the rotation of the knob 104. Thus, this provides a remote control for the cam 102 which determines the positioning of the spool 89 within the two way valve and in turn determines whether the gauging device will be operating under the low pressure or high pressure system. In one position the normal operation will be directly from the manifold chamber 62 through conduit 87 through the two way valve 89 and the conduit 89' to the gauge 41 and wherein the spring 116, FIG. 3, is effective for biasing the spool 89 to the position shown establishing communication between conduits 87 and 89'.

To switch to the high pressure system utilizing the booster the knob 104 is rotated so that cam 102 projects the spindle 101 inwardly against the action of spring 116 cutting off communication from conduit 87 and establishing communication between conduit 99 and delivery conduit 89'. Thus, there is provided low pressure system and high pressure system operated in conjunction with a booster and with both systems regulated by the manifold chamber pressure under the control of the gauge element 84. The amount of air bled through the gauge element 84 and through its orifices 85 depends upon the diameter or other dimension of the work piece being gauged in a comparison with respect to the bore 118 of master rings 117 and wherein the master rings, of which there may be two in setting up the device, has bore diameters which vary as, for example, between 1.000 inch and 1.001 inches.

By setting up the device first using the gauge element 84 with respect to the master rings 117, the needle 107 will move with respect to the calibrations 108 on the dial 109 within the allowable range corresponding to the two master rings employed. Accordingly, when the gauge element 84 is projected within a bore to be gauged, the dimension of that bore will be satisfactory and acceptable provided the needle 107 moves within the range which has been established. If it moves outside of that range then the part or the bore or other dimension is rejected.

Having described my invention reference should now be had to the following claims.

I claim:

1. In an air flow device for gauging bores or the predetermined dimension of a part, wherein air leakage from a gauge element within said bore or relative to such part is visibly measured and compared with air leakage from said gauge element within a predetermined master bore or part of predetermined dimension, thus providing a range for the selection or rejection of work pieces;
   the invention comprising a base;
   a manifold mounted on said base having a chamber;
   an air pressure responsive gauge, including a needle and a calibrated dial mounted on said base;
   a conduit interconnecting said manifold chamber and gauge;
   a manually adjustable flow control valve on said base having an inlet and an outlet;
   a conduit interconnecting said outlet and said manifold chamber;
   a source of air under regulated pressure connected to said inlet;
   a gauge element having an orifice;
   a conduit between said manifold chamber and gauge element;
   said flow control valve adapted to regulate the range of movement of said needle and in turn the magnification adjustment of said gauge for a predetermined pressure of said air source;
   and a manually adjustable air bleed valve on said base having an inlet connected with said manifold chamber and an outlet to atmosphere, being a zero adjustment for said gauge for said predetermined air source;
   an adjustable two way valve having an outlet and a pair of inlets;
   one inlet and said outlet being interposed in the conduit between said manifold chamber and gauge;
   an air pressure responsive booster valve on said base having an inlet connected to said source of air under regulated pressure and a delivery outlet connected to the other inlet of said two way valve to provide a high amplification factor;
   and a control conduit interposed between said manifold chamber and said booster valve for determining a multiple regulated pressure communicated to said gauge proportional to varying pressure conditions in said manifold chamber.

2. In the air flow device of claim 1,
   said two way valve including a reciprocal valve spool biased in one direction establishing communication between one of its inlets and said outlet;
   and a manually rotatable cam on said base registerable with said spool for establishing communication between its other inlet and said outlet.

3. In the air flow device of claim 2,
a dial on said base, and a knob connected to said cam and rotatable relative to said latter dial to indicate high or low amplification.

4. In the air flow device of claim 1, said base including a housing for said manifold, gauge, flow control and bleed valves, regulated air source, and conduits;
said housing including a front wall having a fixed lower panel and an apertured upper panel mounting said gauge and pivotally connected to said lower panel;
said upper panel being manually adjustable and tiltable inwardly of said housing regulating the viewing angle of said gauge and its dial.

5. In air flow device of claim 4,
a stop limiting tilting movement of the upper panel outwardly of the housing and;
manually operable screw means on said housing connected to said upper panel for tilting the same inwardly.

6. In the air flow device of claim 1, said base including a housing having sidewalls and a topwall;
a block in the housing interposed between and secured to said sidewalls adjacent the topwall;
said two way valve nested in said block;
and an air exhaust muffler in said block including a bore having a series of outlets and an inlet connected to the outlet of said bypass valve.

7. In the air flow device of claim 1, and an adaptor relay interposed in the conduit between said two way valve and said gauge for transmitting uniform pressure thereto.

8. In an air flow device for gauging bores or the predetermined dimension of a part, wherein air leakage from a gauge element within said bore or relative to such part is visibly measured and compared with air leakage from said gauge element within a predetermined master bore or part of predetermined dimension, thus providing a range for the selection or rejection of work pieces;
the invention comprising a base;
a manifold mounted on said base having a chamber;
an air pressure responsive gauge, including a needle and a calibrated dial mounted on said base;
a conduit interconnecting said manifold chamber and gauge;
a manually adjustable flow control valve on said base having an inlet and an outlet;
a conduit interconnecting said outlet and said manifold chamber;
a source of air under regulated pressure connected to said inlet;
a gauge element having an orifice;
a conduit between said manifold chamber and gauge element;
said flow control valve adapted to regulate the range of movement of said needle and in turn the magnification adjustment of said gauge for a predetermined pressure of said air source;
a manually adjustable air bleed valve on said base having an inlet connected with said manifold chamber and an outlet to atmosphere, being a zero adjustment for said gauge for said predetermined air source;
said base including a housing having a front panel;
an apertured spindle adapter mounted on said front panel projecting forwardly thereof;
an apertured adapter sleeve removably secured within said adapter;
said sleeve adapted to supportably receive said gauge element.

9. In an air flow device for gauging bores or the predetermined dimension of a part, wherein air leakage from a gauge element within said bore or relative to such part is visibly measured and compared with air leakage from said gauge element within a predetermined master bore or part of predetermined dimension, thus providing a range for the selection or rejection of work pieces;
the invention comprising a base;
a manifold mounted on said base having a chamber;
an air pressure responsive gauge, including a needle and a calibrated dial mounted on said base;
a conduit interconnecting said manifold chamber and gauge;
a manually adjustable flow control valve on said base having an inlet and an outlet;
a conduit interconnecting said outlet and said manifold chamber;
a source of air under regulated pressure connected to said inlet;
a gauge element having an orifice;
a conduit between said manifold chamber and gauge element;
said flow control valve adapted to regulate the range of movement of said needle and in turn the magnification adjustment of said gauge for a predetermined pressure of said air source;
a manually adjustable air bleed valve on said base having an inlet connected with said manifold chamber and an outlet to atmosphere, being a zero adjustment for said gauge for said predetermined air source;
said base including a housing having a front panel;
an apertured spindle adapter mounted on said front panel projecting forwardly thereof;
an apertured adapter sleeve removably secured within said adapter;
the conduit between said manifold chamber and said gauge element, including a first pipe from the manifold to said adapter communicating with the sleeve therein;
and a second pipe at one end supportedly received in said sleeve.

10. In an air flow device for gauging bores or the predetermined dimension of a part, wherein air leakage from a gauge element within said bore or relative to such part is visibly measured and compared with air leakage from said gauge element within a predetermined master bore or part of predetermined dimension, thus providing a range for the selection or rejection of work pieces;
the invention comprising a base;
a manifold mounted on said base having a chamber;
an air pressure responsive gauge, including a needle and a calibrated dial mounted on said base;
a conduit interconnecting said manifold chamber and gauge;
a manually adjustable flow control valve on said base having an inlet and an outlet;
a conduit interconnecting said outlet and said manifold chamber;
a source of air under regulated pressure connected to said inlet;
a gauge element having an orifice;
a conduit between said manifold chamber and gauge element;
said flow control valve adapted to regulate the range of movement of said needle and in turn the magnification adjustment of said gauge for a predetermined pressure of said air source;
a manually adjustable air bleed valve on said base having an inlet connected with said manifold chamber and an outlet to atmosphere, being a zero adjustment for said gauge for said predetermined air source;
said air pressure responsive gauge including a body;
a cover mounting a glass threaded on the front of the body;
a pair of locator pin supports on the body adjacent to and inwardly of its front;
said dial having an enlarged central aperture to removably fit over said needle facilitating a change of dails;
and a pair of spaced rivets secured through said dial apertured at their inner ends to reecive said pin supports and projecting forwardly of the dial at their other end for operative registry with said glass.

References Cited

UNITED STATES PATENTS 3,182,488  5/1965  Hollister _____ 73—37.5

FOREIGN PATENTS 632,807  10/1927  France.

DAVID SCHONBERG, *Primary Examiner.*
LOUIS PRINCE, *Examiner.*
W. HENRY, *Assistant Examiner.*